US008520265B2

(12) United States Patent
Kosasa et al.

(10) Patent No.: US 8,520,265 B2
(45) Date of Patent: Aug. 27, 2013

(54) ENGRAVING PROCESSING APPARATUS AND IMAGE FORMING APPARATUS

(75) Inventors: Hideaki Kosasa, Abiko (JP); Masahiko Yokota, Abiko (JP); Wataru Kawata, Kashiwa (JP); Toshiro Tomono, Toride (JP); Ryuichi Kojima, Toride (JP); Akihiro Shimizu, Kashiwa (JP); Shoji Takeda, Arakawa-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1756 days.

(21) Appl. No.: 11/762,602

(22) Filed: Jun. 13, 2007

(65) Prior Publication Data

US 2007/0291102 A1 Dec. 20, 2007

(30) Foreign Application Priority Data

Jun. 20, 2006 (JP) ................................ 2006-170252
Jun. 20, 2006 (JP) ................................ 2006-170253
May 18, 2007 (JP) ................................ 2007-133040

(51) Int. Cl.
*H04N 1/40* (2006.01)

(52) U.S. Cl.
USPC .......................................... 358/3.29; 382/100

(58) Field of Classification Search
USPC .......................................... 358/3.29; 382/100
See application file for complete search history.

(56) References Cited

U.S. PATENT DOCUMENTS

2004/0258274 A1* 12/2004 Brundage et al. ............. 382/100

FOREIGN PATENT DOCUMENTS

| | | | |
|---|---|---|---|
| JP | 10-272874 | A | 10/1998 |
| JP | 10-272874 | A | 10/1998 |
| JP | 2000-094865 | A | 4/2000 |
| JP | 2000-094869 | A | 4/2000 |
| JP | 2000-514741 | A | 11/2000 |
| JP | 2001-062573 | A | 3/2001 |
| JP | 2002-144059 | A | 5/2002 |
| JP | 2003-209032 | A | 7/2003 |
| JP | 2006-005187 | A | 1/2006 |

* cited by examiner

*Primary Examiner* — Twyler Haskins
*Assistant Examiner* — Michael Burleson
(74) *Attorney, Agent, or Firm* — Canon USA Inc IP Division

(57) ABSTRACT

An engraving processing apparatus includes a laser engraving unit configured to perform engraving processing for forming a recessed portion on a sheet by irradiating a laser beam onto the sheet, and a controller configured to control an engraving processing operation of the laser engraving unit.

10 Claims, 10 Drawing Sheets

ENGRAVING PROCESSING APPARATUS AND IMAGE FORMING APPARATUS

BACKGROUND OF THE INVENTION

1. Field of the Invention

The present invention relates to an engraving processing apparatus using a laser engraving unit and to an image forming apparatus including the engraving processing apparatus. In particular, the present invention relates to an engraving processing apparatus configured to use a laser engraving unit to perform an engraving processing to an image-formed sheet.

2. Description of the Related Art

In printing a valuable print product, such as a ticket or a voucher, in a small lot using an image forming apparatus, such as an electrophotographic apparatus, a function for determining authenticity thereof, such as an authenticity certificate which certifies the print product is authentic, can be added to the print product to prevent the authenticity certificate from being reproduced even if the print product is copied.

Japanese Patent Application Laid-Open No. 10-272874 discusses an apparatus that selectively irradiates a sheet surface with a laser beam to engrave, on the sheet surface, variable information including characters or numerals for disabling falsified copying of an authentic original. However, in the apparatus discussed in Japanese Patent Application Laid-Open No. 10-272874, only the engraving processing to an image-formed side of a sheet is possible. Accordingly, various types of sheets cannot be flexibly handled.

SUMMARY OF THE INVENTION

The present invention includes an engraving processing apparatus and an image forming apparatus capable of generating a print product usable as an authentic original whose authenticity can be visually determined by forming a recessed portion on a sheet with laser engraving.

The present invention also includes an engraving processing apparatus and an image forming apparatus capable of selectively forming engraving usable for certifying an authentic original and capable of stably performing engraving processing according to a sheet thickness or a light transmission property of a sheet.

According to an aspect of the present invention, an engraving processing apparatus includes a laser engraving unit configured to perform an engraving processing operation for forming a recessed portion on a sheet by irradiating a laser beam onto the sheet. The laser engraving unit is configured to perform the engraving processing operation on a side of the sheet opposite to a side onto which an image has been formed.

According to another aspect of the present invention, an engraving processing apparatus includes a laser engraving unit configured to perform an engraving processing operation for forming a recessed portion on a sheet by irradiating a laser beam onto the sheet, and a controller configured to control an engraving processing operation of the laser engraving unit. The controller includes a mode for engraving, wherein the mode for engraving includes at least two of a first engraving forming mode for performing the engraving processing operation on a side of the sheet opposite a side on which an image is to be formed, a second engraving forming mode for performing the engraving processing operation on the side of the sheet on which an image is to be formed, and a third engraving forming mode for performing the engraving processing operation on both sides of the sheet.

According to an exemplary embodiment of the present invention, engraving information is formed as a recessed portion on a side opposite to an image-formed side of a sheet. Accordingly, a printed sheet can be certified as an authentic original while securing flatness and smoothness of the image-formed side of the sheet. In addition, an engraving certifying that a print product is authentic is selectively added corresponding to various types of sheets to stably perform engraving according to the sheet thickness and light transmission property of the sheet. Accordingly, the engraving cannot be reproduced at the time of copying due to the transmission of light through the sheet. Thus, a print product can be certified as an authentic original.

Further features and aspects of the present invention will become apparent from the following detailed description of exemplary embodiments with reference to the attached drawings.

BRIEF DESCRIPTION OF THE DRAWINGS

The accompanying drawings, which are incorporates in and constitute a part of the specification, illustrate exemplary embodiments, features, and aspects of the invention and, together with the description, serve to explain the principle of the invention.

DETAILED DESCRIPTION OF THE EXEMPLARY EMBODIMENTS

Various exemplary embodiments, features and aspects of the present invention will now be described with reference to the drawings. It is be noted that the relative arrangement of the components, the numerical expressions, and numerical values set forth in these embodiments are not intended to limit the scope of the present invention unless it is specifically stated otherwise.

Figure 1:
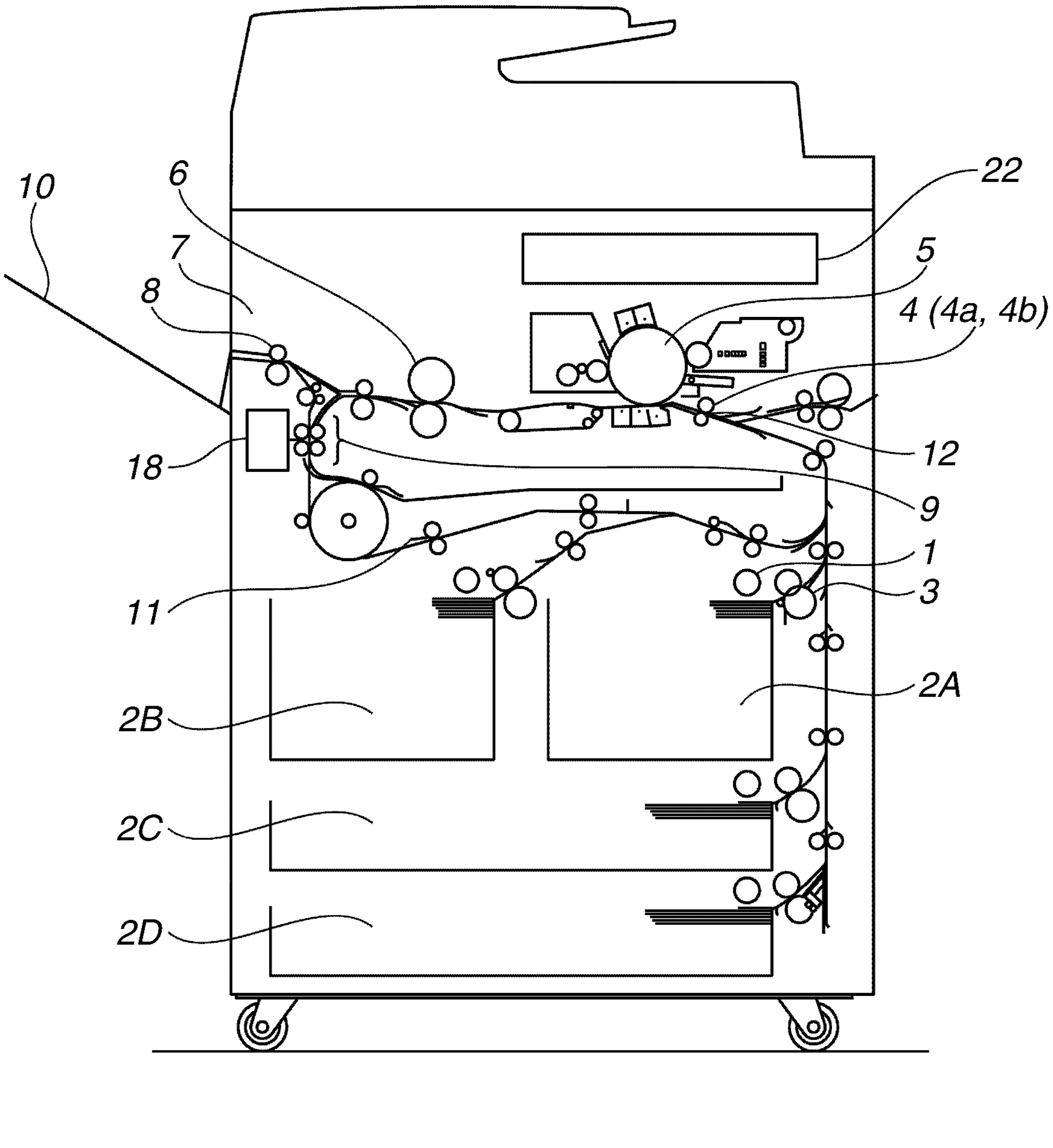
FIG. 1 illustrates an exemplary configuration of an image forming apparatus including an engraving processing apparatus according to an exemplary embodiment of the present invention.

FIG. 1 illustrates an exemplary configuration of an image forming apparatus including an engraving processing apparatus according to an exemplary embodiment of the present invention. Referring to FIG. 1, an image forming apparatus 7 includes a laser engraving unit 18 configured to perform engraving processing onto a sheet on which an image is formed by the image forming apparatus 7.

Sheets extracted from either one of sheet cassettes 2A through 2D by a pickup roller 1 of a sheet feeding unit are separated from one another by a separation unit 3 and are fed sheet by sheet.

The fed sheet is conveyed to a registration roller pair 4 (4*a*, 4*b*). A leading edge of the conveyed sheet contacts the registration roller pair 4 to form a loop. Thus, skewing of the sheet is corrected. The registration roller pair 4 can also serve as a sheet thickness detection roller, as described below.

A transparent sheet detection unit 12 is located on an upstream side of the registration roller pair 4 in the direction of conveyance of a sheet. The transparent sheet detection unit 12 detects the amount of light passing through the sheet whose leading edge is in contact with the registration roller pair 4. The transparent sheet detection unit 12 determines whether the sheet is a transparent sheet based on variation of the amount of light blocked by the sheet.

Then, the sheet is conveyed by the registration roller pair 4 to a space between a photosensitive drum 5 and a transfer device (not shown), which opposes the photosensitive drum 5, in synchronization with rotation of the photosensitive drum 5. At this time, a toner image formed on the surface of the photosensitive drum 5 by an exposure unit (not shown) and a development unit (not shown) is transferred onto the sheet by an operation of the transfer device. The photosensitive drum 5, the transfer device, the exposure unit, and the development unit constitute an image forming unit.

The sheet is then guided to a fixing roller pair 6, where the toner image transferred onto the sheet is fixed after being applied with heat and pressure. The fixed sheet is discharged to the outside of the image forming apparatus 7 by a discharge roller pair 8 to be stacked on a sheet discharge tray 10.

The present embodiment is described with an electrophotographic image forming apparatus as an example. However, the present embodiment is not limited to this type of apparatus. For example, an inkjet image forming apparatus, or any other type of image forming apparatus that would enable practice of the present invention can be used.

In performing engraving onto the sheet, the sheet that has an image fixed thereto by the fixing roller pair 6 is conveyed from the discharge roller pair 8 to a reversing conveyance unit 9 in a switchback manner. The sheet is then engraved by the laser engraving unit 18, which is located adjacent to the reversing conveyance unit 9.

The laser engraving unit 18 irradiates a side (back side) opposite to an image-formed side of the sheet with a laser beam of a level ranging approximately from 25 to 120 W to form a recessed portion or portions indicating engraving information on the back side of the sheet. The laser engraving unit 18 has a laser output level previously set according to the sheet thickness and the type of the sheet such that the sheet thickness at the engraving recessed portion becomes approximately 30 μm.

The sheet, whose side opposite to the image-formed side has been engraved with a laser beam, is conveyed from the reversing conveyance unit 9 to be discharged to the outside of the image forming apparatus 7. Furthermore, when a setting is performed to form images on both sides of the sheet, the sheet passes through the reversing conveyance unit 9 to be conveyed to a two-sided conveyance unit 11. Then, the sheet passes through the registration roller pair 4, the photosensitive drum 5, and the transfer device to allow an image to be formed on the second side of the sheet.

The laser engraving unit 18, which performs engraving processing onto a sheet at the reversing conveyance unit 9, will now be described in detail.

Figure 2A:
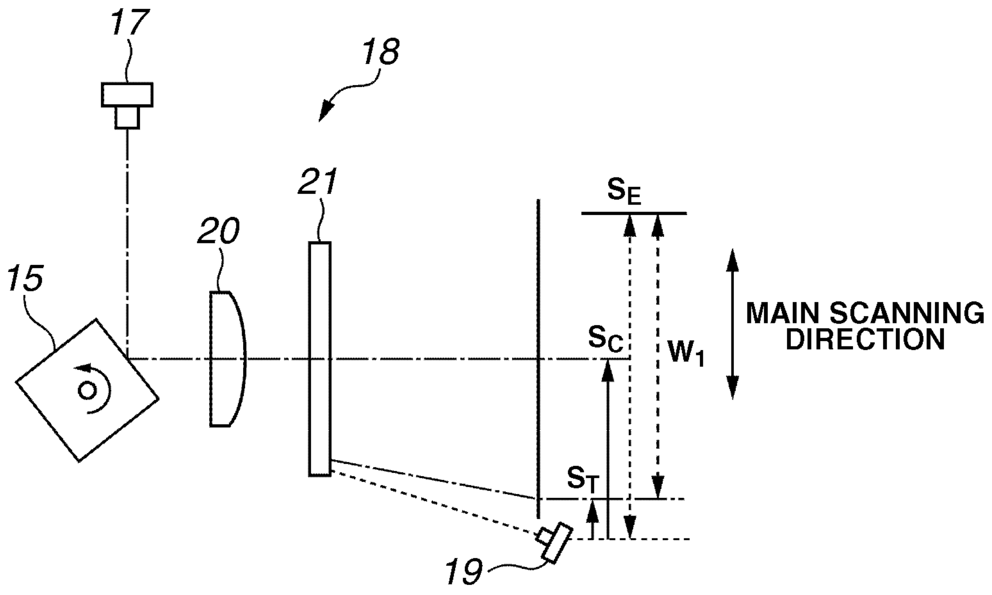
FIG. 2A and FIG. 2B each illustrate an exemplary configuration of a laser engraving unit included in the engraving processing apparatus according to an exemplary embodiment of the present invention.
Figure 2B:
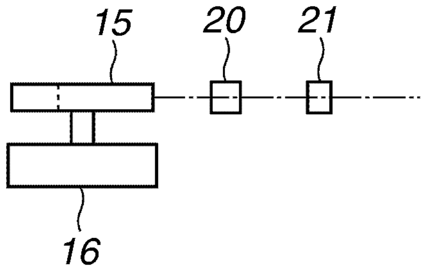

FIG. 2A is a plain view of the laser engraving unit 18. FIG. 2B is a cross section of the laser engraving unit 18. Referring to FIG. 2A and FIG. 2B, the laser engraving unit 18 includes a polygon mirror 15, a polygon motor 16 that rotationally drives the polygon mirror 15, a laser diode 17, which is a light source, a beam detection (BD) sensor 19, and lenses 20 and 21.

In the present embodiment, the polygon mirror 15 includes four mirrors. However, the number of mirrors of the polygon mirror 15 is not limited to four and any number that would enable practice of the present invention is applicable.

The laser diode 17 is turned on and off by a drive circuit (not shown) according to a signal (engraving information). An oscillating laser beam emitted from the laser diode 17 is irradiated toward the polygon mirror 15. The polygon mirror 15 rotates in a direction indicated by an arrow in FIG. 2A. The irradiated laser beam is reflected by reflection surfaces of the polygon mirror 15 as a deflection beam that continuously changes an angle thereof.

The reflected light is subjected to correction of distortion by the lenses 20 and 21 and then scans the surface of the sheet at the reversing conveyance unit 9 in the main scanning direction. The reversing conveyance unit 9 conveys the sheet in the sub scanning direction.

One surface of the polygon mirror 15 corresponds to scanning in one line. A laser beam emitted from the laser diode 17 scans the surface of the sheet line by line according to the rotation of the polygon mirror 15 and the conveyance of the sheet by the reversing conveyance unit 9 in the sheet conveyance direction.

The BD sensor 19 is located near a scanning start position $S_T$ on the side edge of the sheet. The laser beam reflected from each reflection surface of the polygon mirror 15 is detected by the BD sensor 19 before scanning in one line.

The detected BD signal is used as a scanning start reference signal. Scanning start positions $S_T$ in respective lines in the main scanning direction are synchronized using the BD signal as a reference. A width $W_1$, from the scanning start position $S_T$ to a scanning end position SE passing a scanning center $S_C$, is an area for engraving processing.

The laser engraving unit 18 is mounted such that each reflection surface of the polygon mirror 15 is in parallel with a sheet conveyance surface of the reversing conveyance unit 9. With this configuration, when a laser beam is irradiated, a recessed portion is formed on the sheet in a scanning width of one line and in a predetermined depth.

In the present embodiment, a spot diameter of the laser beam is in an elliptic shape having a major axis of 90 μm and a minor axis of 60 μm. The minor axis direction is set the same as the main scanning direction. Accordingly, the width for one line of the recessed portion is 90 μm.

In the case of scanning in a plurality of lines, adjacent lines are overlapped. In the present embodiment, the amount of overlapping is set to be 30 μm. Accordingly, in the case of scanning in three lines, the width of the recessed portion is 210 μm. Thus, an engraving having a width of 210 μm can be formed. The amount of overlapping and the value for the major and minor axes set for the laser beam are not limited to the above-described values, and any values that would enable practice of the present invention are applicable.

An exemplary configuration of a controller 22, which controls the entire image forming apparatus 7, will now be described with reference to FIG. 4.

The controller 22 includes a central processing unit (CPU) circuit unit 150. The CPU circuit unit 150 includes a CPU (not shown), a read-only memory (ROM) 151, and a random access memory (RAM) 152. The RAM 152 temporarily stores control data and is used as a work area by the CPU. The CPU circuit unit 150 executes a control program stored in the ROM 151 to control the controller 22.

A document feeding apparatus control unit 101 drives and controls a document feeding apparatus (not shown) according to an instruction from the CPU circuit unit 150. An image reader control unit 201 drives and controls a scanner unit (not shown) and an image sensor (not shown) and transfers an analog image signal output from the image sensor to an image signal control unit 202.

The image signal control unit 202 converts the analog image signal from the image sensor into a digital signal before performing various processings on the converted digital signal. Then, the image signal control unit 202 converts the processed digital signal into a video signal to output the converted video signal to a printer control unit 301. Furthermore, the image signal control unit 202 performs various processings on a digital image signal input from a personal computer (PC) terminal 260 via an external interface (I/F) 259. Moreover, the image signal control unit 202 converts the processed digital image signal into a video signal and then outputs the converted video signal to the printer control unit 301.

The processing operation by the image signal control unit 202 is controlled by the CPU circuit unit 150. The printer control unit 301 drives an exposure control unit (not shown) according to the input video signal to expose the photosensitive drum 5.

An operation unit 153, which is an input unit, includes a plurality of keys operable for setting various functions related to image forming and a display unit for displaying information about the setting. The operation unit 153 outputs a key signal corresponding to an operation on each key to the CPU circuit unit 150 and displays information corresponding on the display unit according to a signal from the CPU circuit unit 150.

When an engraving forming mode is selected, the operation unit 153 displays an image to be formed as a preview. A user can enter engraving characters and/or engraving images and a position and size of engraving as engraving information according to the preview.

The engraving information can be input via the operation unit 153, can be read from the image reader control unit 201, or can be input from the PC terminal 260, which is in communication with the image forming apparatus 7 via the external I/F 259. In addition, a part of the previewed image can be area-designated to be used as engraving information.

An engraving signal control unit 251, which is an image processing unit, performs various processings on a digital engraving signal as an engraving information input from the PC terminal 260 via the external I/F 259 or a digital engraving signal as an engraving information input from the operation unit 153. The engraving signal control unit 251 converts the input digital engraving signal into a video signal to output the video signal to an engraving unit drive control unit 261. Furthermore, the engraving signal control unit 251 modifies a laser focal position by an amount equivalent to the sheet thickness according to a result of sheet thickness detection by a sheet thickness detection unit 400.

Moreover, the engraving signal control unit 251 outputs the video signal to the engraving unit drive control unit 261 so that the engraving unit drive control unit 261 adjusts the level of a laser output according to a material of the sheet. The processing operation by the engraving signal control unit 251 is controlled by the CPU circuit unit 150 and is performed to control the engraving unit drive control unit 261 according to the video signal.

In the present embodiment, the laser engraving unit 18 is incorporated in the image forming apparatus 7. However, the laser engraving unit 18 can be located external to the image forming apparatus 7 as an independent engraving processing apparatus or as a unit incorporated in a sheet processing apparatus having a sheet processing function.

In this case, the engraving signal control unit 251, which controls engraving processing, and the engraving unit drive control unit 261 can be incorporated in a sheet processing control unit of the sheet processing apparatus to control the laser engraving unit 18. Alternatively, the laser engraving unit 18 can be directly controlled from the controller 22 of the image forming apparatus 7.

Figure 3:
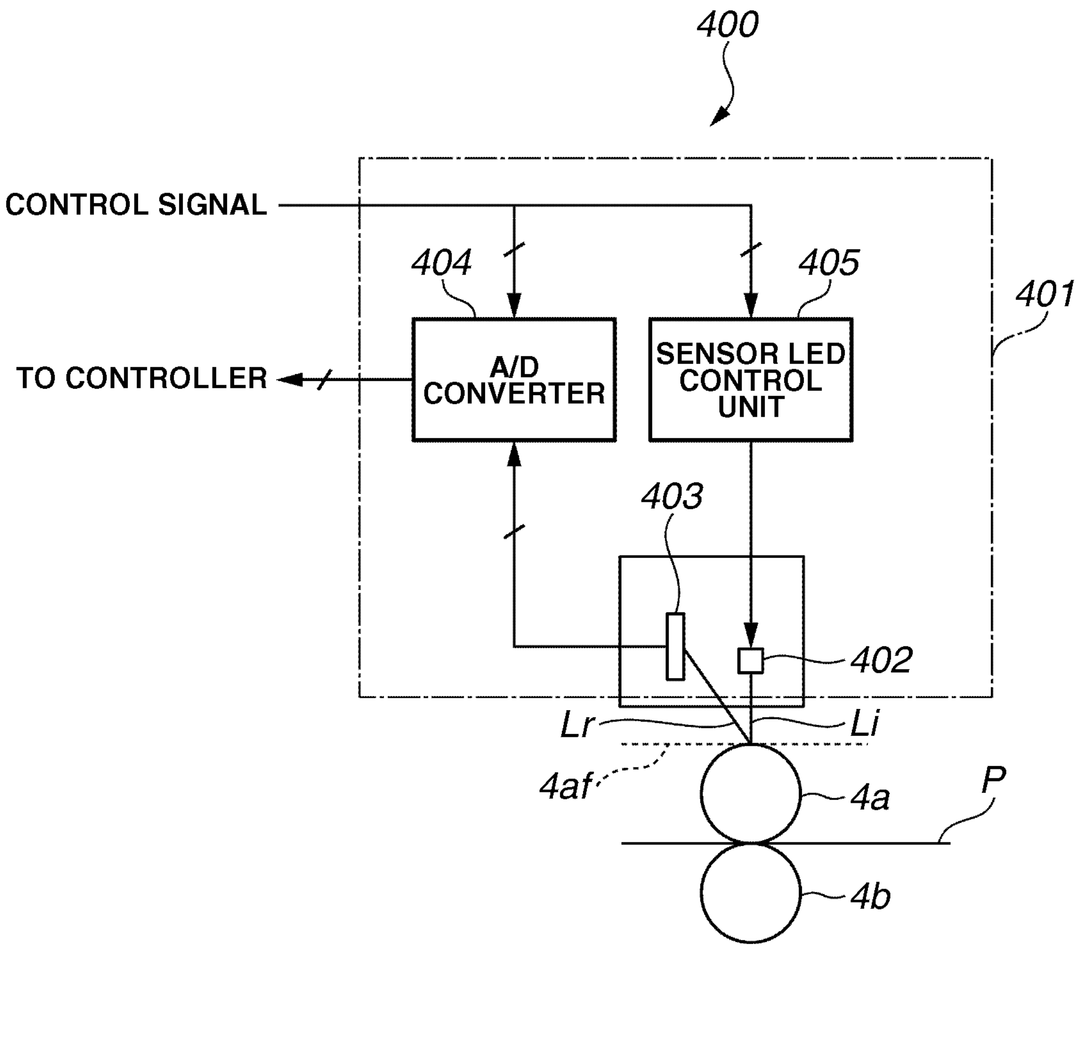
FIG. 3 illustrates an exemplary configuration of a sheet thickness detection unit included in the engraving processing apparatus according to an exemplary embodiment of the present invention.

FIG. 3 illustrates an exemplary configuration of the sheet thickness detection unit 400.

The sheet thickness detection unit 400 includes a displacement amount detection unit 401 and registration rollers 4*a* and 4*b*, which serve as sheet thickness detection rollers. Irradiation light Li emitted from a light-emitting diode (LED) 402 of the displacement amount detection unit 401 is reflected by an outer peripheral (reflection) surface of the upper registration roller (sheet thickness detection roller) 4*a*. Then, reflection light Lr enters a light receiving position sensor 403 of the displacement amount detection unit 401.

The lower registration roller 4*b* is stationary and the upper registration roller 4*a* is free to move. Thus, when a sheet P is pinched between the upper and lower registration rollers 4*a* and 4*b*, the upper registration roller 4*a* moves in the vertical direction according to the thickness of the sheet P.

Thus, the displacement amount detection unit 401 detects a height 4*af* of the reflection surface of the upper registration roller 4*a* moving according to the thickness of the sheet P. The reflection surface height 4*af* varies in that the upper registration roller 4*a* moves upward to a position near to the LED 402 when the sheet P is thick, and the upper registration roller 4*a* moves downward to a position away from the LED 402 when the sheet P is thin.

As a result, an angle of incidence of the light entering the light receiving position sensor 403 is changed on a light receiving surface of the light receiving position sensor 403 according to the thickness of the sheet P. The incidence angle of the light is input to an analog/digital (A/D) converter 404 as an analog signal changing according to the thickness of the sheet P. That is, the input signal indicates the thickness of the sheet P.

The timing of blinking of the LED 402 and the amount of light emitted from the LED 402 are controlled by a signal output from a sensor LED control unit 405 according to a control signal from the controller 22. The control signal also controls the timing of A/D conversion performed by the A/D converter 404. A digital signal corresponding to the sheet thickness is transferred from the A/D converter 404 to the controller 22. Then, the CPU circuit unit 150 (FIG. 4) computes the sheet thickness based on the digital signal.

In the present embodiment, the detection of the sheet thickness is performed before image formation. However, the sheet thickness detection unit 400 can be located in the reversing conveyance unit 9 to constitute a unit integrated with the laser engraving unit 18. The thickness of a sheet to be engraved can be previously entered by the user of the image forming apparatus 7 via the operation unit 153 of the image forming apparatus 7 or via the external PC terminal 260.

As illustrated in FIG. 1, the transparent sheet detection unit 12 is located on an upstream side in the sheet conveyance direction of the registration rollers 4*a* and 4*b*. The transparent sheet detection unit 12 determines whether the sheet is a transparent sheet according to variation in the amount of light blocked by the sheet.

The transparent sheet detection unit 12 detects the amount of light at a timing at which a leading edge of the sheet contacts the registration rollers 4*a* and 4*b* to form a loop to correct skewing. In an ordinary case, light is blocked by the sheet whose leading edge is in contact with the registration roller pair 4. When the amount of light is not decreased at such timing, the transparent sheet detection unit 12 determines that the sheet is a transparent sheet, such as an overhead projector (OHP) sheet, which can transmit light.

Figure 4:
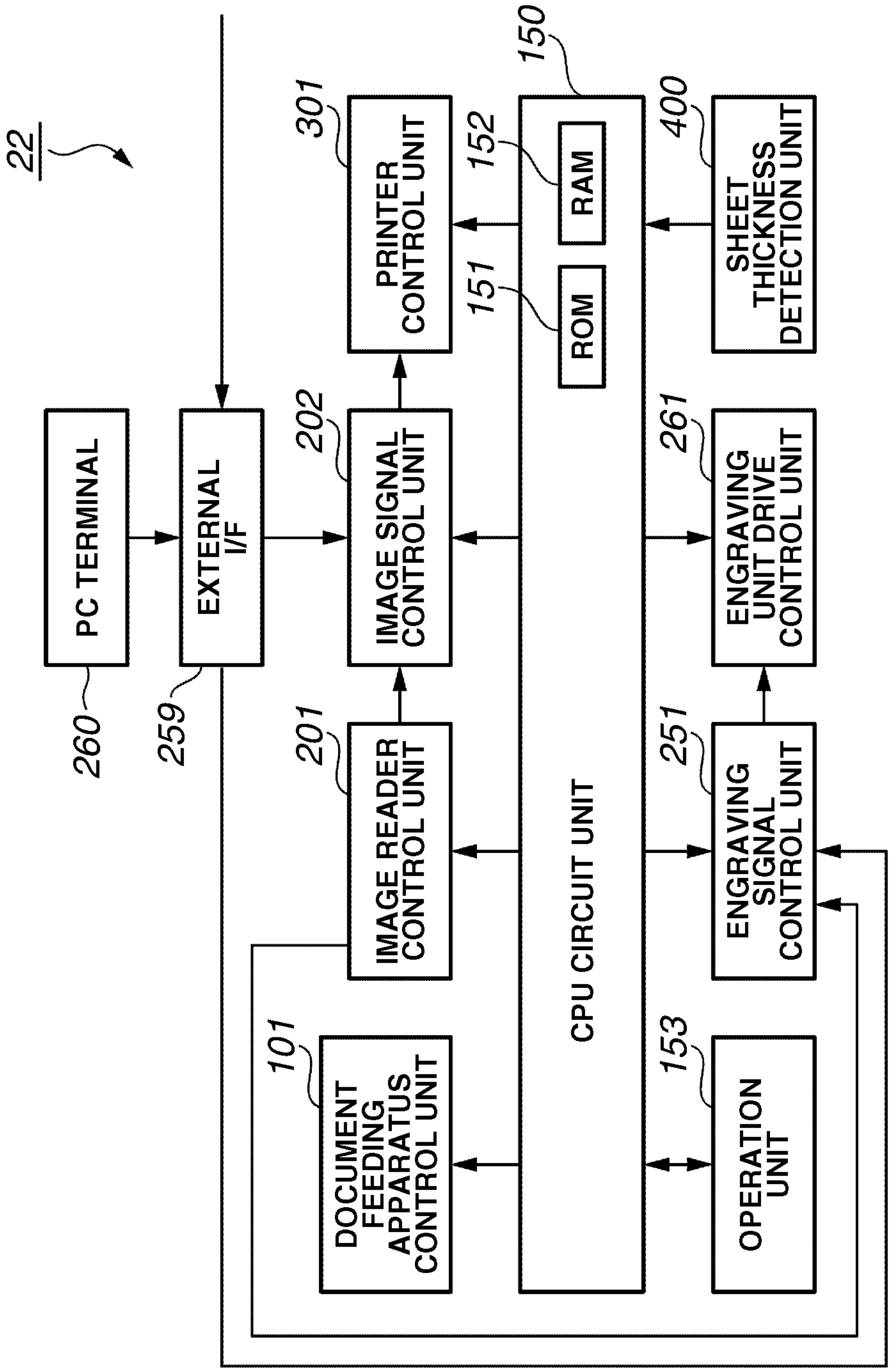
FIG. 4 is a control block diagram of the image forming apparatus according to an exemplary embodiment of the present invention.

With the above-described configuration, in performing engraving on a sheet, the user of the image forming apparatus 7 enters engraving information indicating the shape, size, and position of engraving via the operation unit 153 of the image forming apparatus 7 (FIG. 4) or via the external PC terminal 260 (FIG. 4). Thus, a command for starting an engraving forming mode and print information for image formation are transmitted to the image forming apparatus 7 at the same time. The engraving information is not limited to the above-described configuration, and can be different from the print information or can be a part of the print information.

The image forming apparatus 7, after receiving the command, feeds a sheet with a feeding unit. Then, the thickness of the sheet is detected by the sheet thickness detection unit 400 (FIG. 3).

If, as a result of detecting the sheet thickness, it is determined that an engraving condition is satisfied, the sheet, on which an image has been formed after being subjected to predetermined image forming processing, is conveyed to the reversing conveyance unit 9. At the reversing conveyance unit 9, the laser engraving unit 18 engraves one side or both sides of the sheet. The engraving signal control unit 251 determines, based on information in the print information, a side of a sheet on which an image is to be formed, where the side of the sheet to be engraved is determined based on what side of the sheet the image is to be formed on. If it is determined that the engraving condition is not satisfied, the image forming operation is suspended and the sheet stops at the registration roller pair 4 for a predetermined period of time until the engraving information is modified.

In the present embodiment, the sheet thickness is determined as a condition for engraving in order to secure a sufficient processing depth for a recessed portion of the engraving required to enable the visual determination of authenticity of the sheet. If the processing depth for a recessed portion of the engraving is not at a sufficient level, it is difficult to visually determine authenticity of the sheet.

Furthermore, if, after an engraving is formed on the sheet at a sufficient level of engraving depth, the sheet thickness at the recessed portion becomes thinner than the predetermined sheet thickness, then the strength of the sheet decreases, and thus the sheet may be damaged. If an engraving is formed on a sheet too thin to satisfy the predetermined sheet thickness, a laser beam may form a hole in a print product.

Moreover, if the sheet thickness at the recessed portion of the engraving is smaller than the predetermined sheet thickness, the engraving cannot be easily visually recognized under ordinary visible light because the engraving overlaps with a toner image formed on the image-formed side of the sheet. For the reasons described above, it is necessary to determine the sheet thickness as a condition for performing engraving.

A process flow performed in a back side engraving forming mode (first engraving forming mode) according to an exemplary embodiment of the present invention will be described with reference to the flow chart of FIG. 5.

Figure 5:
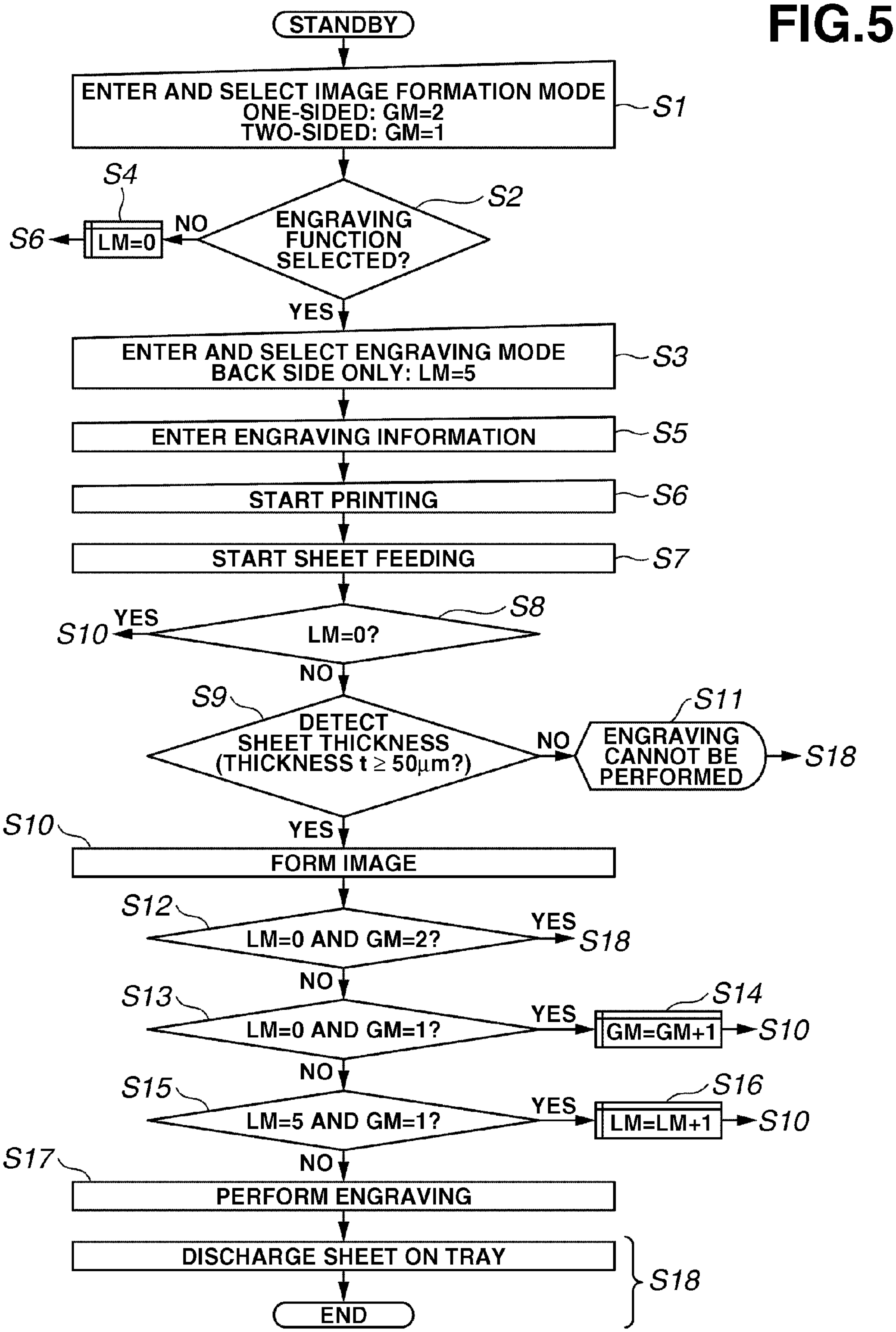
FIG. 5 is a flowchart illustrating a flow of engraving processing control performed by a laser engraving unit according to a first exemplary embodiment of the present invention.

When the engraving forming mode is selected, the CPU circuit unit 150 of the image forming apparatus 7 starts controlling the engraving processing according to the process flow in steps S1 through S18 of FIG. 5.

In step S1, the CPU circuit unit 150 inputs an image forming mode, such as a one-side image forming mode or a two-sided image forming mode. The CPU circuit unit 150 records the input image forming mode (GM value (e.g., one-sided: GM=2, two-sided: GM=1)).

In step S2, the CPU circuit unit 150 determines whether the user has selected an engraving forming mode. If it is determined in step S2 that the user has selected the engraving forming mode, then the process advances to step S3. On the other hand, if it is determined in step S2 that the user has not selected the engraving forming mode, the process 150 advances to step S4.

In step S3, the CPU circuit unit 150 inputs an engraving forming mode for forming engraving on the back side of a sheet (engraving on only a side opposite to an image-formed side of a sheet). The CPU circuit unit 150 records the back side engraving forming mode (e.g., LM value: LM=5).

In step S4, since the user has not selected the engraving forming mode, the CPU circuit unit 150 records the value "LM=0", and then advances to step S6. In step S5, the user enters engraving information, such as the shape, position, size of engraving to be formed, and an area designated for forming an image, via the operation unit 153 of the image forming apparatus 7 or via the PC terminal 260 in communication with the image forming apparatus 7. If it is determined in step S9, as described below, by the sheet thickness detection unit 400 that the sheet thickness is smaller than the predetermined sheet thickness, then the CPU circuit unit 150 restricts the values entered in step S5.

In step S6, the user initiates printing by the image forming apparatus 7 via the operation unit 153 of the image forming apparatus 7 or the PC terminal 260 in communication with the image forming apparatus 7. In step S7, the CPU circuit unit 150 rotates the pickup roller 1 to start feeding of a sheet. Then, the sheet is conveyed to the sheet thickness detection unit 400 associated with the registration roller pair 4.

In step S8, if the value "LM=0" is recorded (if no engraving forming mode has been selected), then the process advances to step S10. On the other hand, if the value "LM=0" is not recorded (if the engraving forming mode has been selected), then the process advances to step S9.

In step S9, if the sheet thickness detected by the sheet thickness detection unit 400 is greater than or equal to the predetermined sheet thickness, namely, if $t \geqq 50$ μm, then the process advances to step S10. On the other hand, if the sheet thickness detected by the sheet thickness detection unit 400 is less than the predetermined sheet thickness, namely, if $t<50$ μm, then the process advances to step S11.

If it is determined in step S9 that the sheet thickness is less than the predetermined sheet thickness, then in step S11, the CPU circuit unit 150 displays a message indicating "engraving cannot be formed" on a display unit (a monitor of the operation unit 153 or a monitor of the PC terminal 260 in communication with the image forming apparatus 7). Then, the CPU circuit unit 150 advances to step S18.

In step S10, the CPU circuit unit 150 performs image formation, transfers a toner image onto the sheet, and allows the transferred toner image to be fixed with the fixing roller pair 6.

In step S12, if the recorded LM value and GM value are "LM=0" and "GM=2", respectively, the process advances to step S18. On the other hand, if the recorded LM value and GM value are other than "LM=0" and "GM=2", respectively, the process advances to step S13.

In step S13, if the recorded LM value and GM value are "LM=0" and "GM=1", respectively, the process advances to step S14. On the other hand, if the recorded LM value and GM value are other than "LM=0" and "GM=1", respectively, the process advances to step S15.

In step S14, the CPU circuit unit 150 overwrites the GM value with the value "GM=GM+1" and internally records the overwritten value. The process then returns to step S10.

In step S15, if the recorded LM value and GM value are "LM=5" (indicating the back side engraving forming mode) and "GM=1", respectively, the process advances to step S16. On the other hand, if the recorded LM value and GM value are other than "LM=5" and "GM=1", respectively, the process advances to step S17.

In step S16, the CPU circuit unit 150 overwrites the LM value with the value "LM=LM+1" and internally records the overwritten value. The process then returns to step S10.

In step S17, the CPU circuit unit 150 causes the laser engraving unit 18 to form an engraving of a reverse image (mirror image) of the input engraving information on a side opposite to an image-formed side of the sheet. The processing then proceeds to step S18, where the sheet is discharged onto the paper discharge tray 10, and then the processing ends.

Figure 6A:
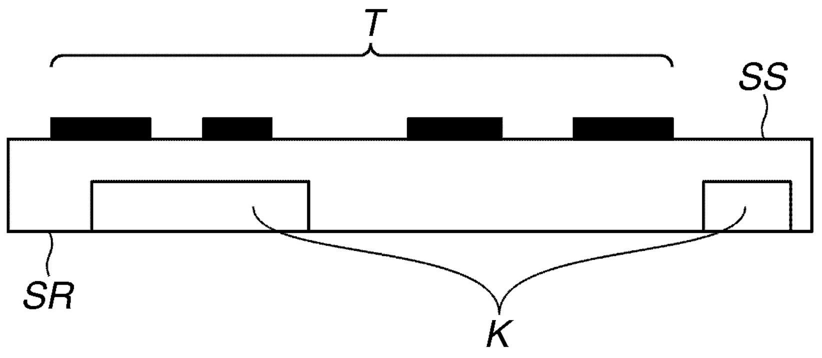
FIG. 6A and FIG. 6B each illustrate engraving processing performed by the laser engraving unit according to the first exemplary embodiment of the present invention.
Figure 6B:
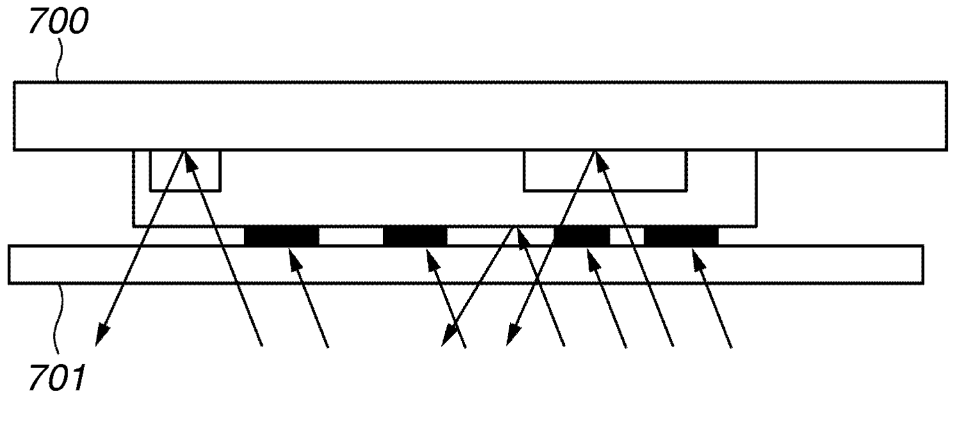

FIG. 6A and FIG. 6B each illustrate a cross section of the sheet on which an engraving has been formed according to the present embodiment. As illustrated in FIG. 6A, a toner image T is formed on an image-forming side SS of a sheet. A laser engraving portion (recessed portion) K is formed on a back side SR of the sheet (a side opposite to the image-formed side SS). Referring to FIG. 6B, the sheet is placed on a document mounting glass plate 701 of the image forming apparatus 7.

In copying the sheet with the image forming apparatus 7, as illustrated in FIG. 6B, light emitted onto the engraving recessed portion K, in which the toner image T is not formed, among light emitted onto the image-formed side SS, passes through the engraving recessed portion K, because the sheet thickness at the engraving recessed portion K is thin. The light having passed through the engraving recessed portion K is reflected by the back side of a document pressing plate 700 of the image forming apparatus 7. As a result, the engraving recessed portion K cannot be copied by the image forming apparatus 7.

Figure 7A:
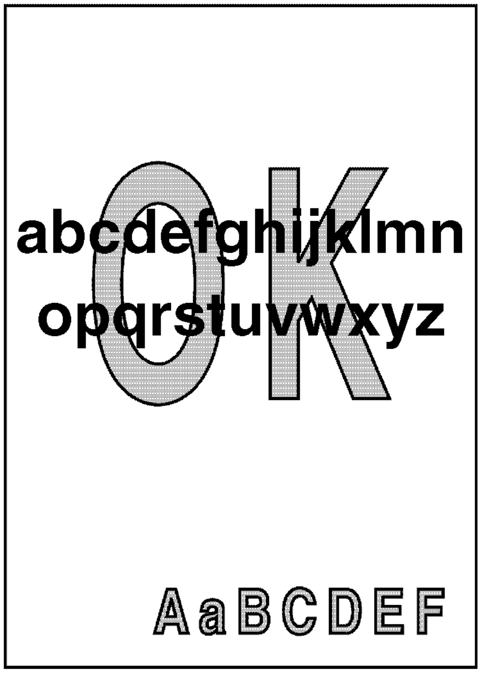
FIG. 7A and FIG. 7B each illustrate engraving processing performed by the laser engraving unit according to the first exemplary embodiment of the present invention.
Figure 7B:
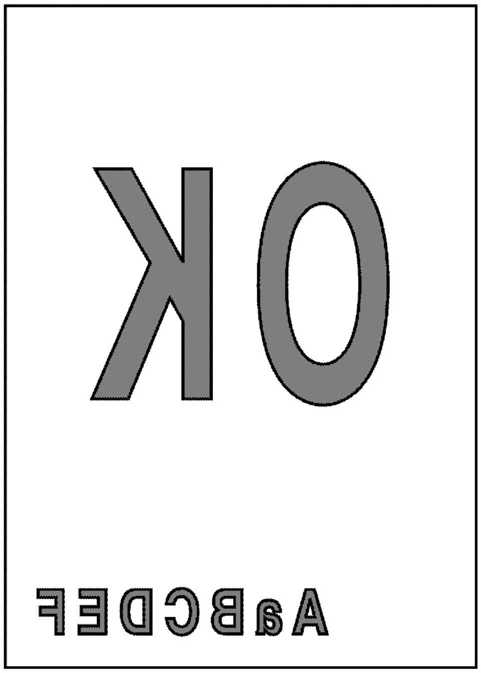

FIG. 7A illustrates the image-formed side SS, which is a print product according to the present embodiment. FIG. 7B illustrates the back side SR (engraving-formed side) opposite to the image-formed side SS. On the back side SR, the engraving information that has been subjected to reversing processing by the engraving signal control unit 251 is laser-engraved as a mirror image as illustrated in FIG. 7B. Accordingly, the engraving information can be visually recognized when seen through the image-formed side SS.

The engraving information is formed as a recessed portion on a side opposite to the image-formed side of the sheet. Accordingly, a print product can be authenticated as an authentic original while securing flatness and smoothness of the image-formed side.

Figure 8:
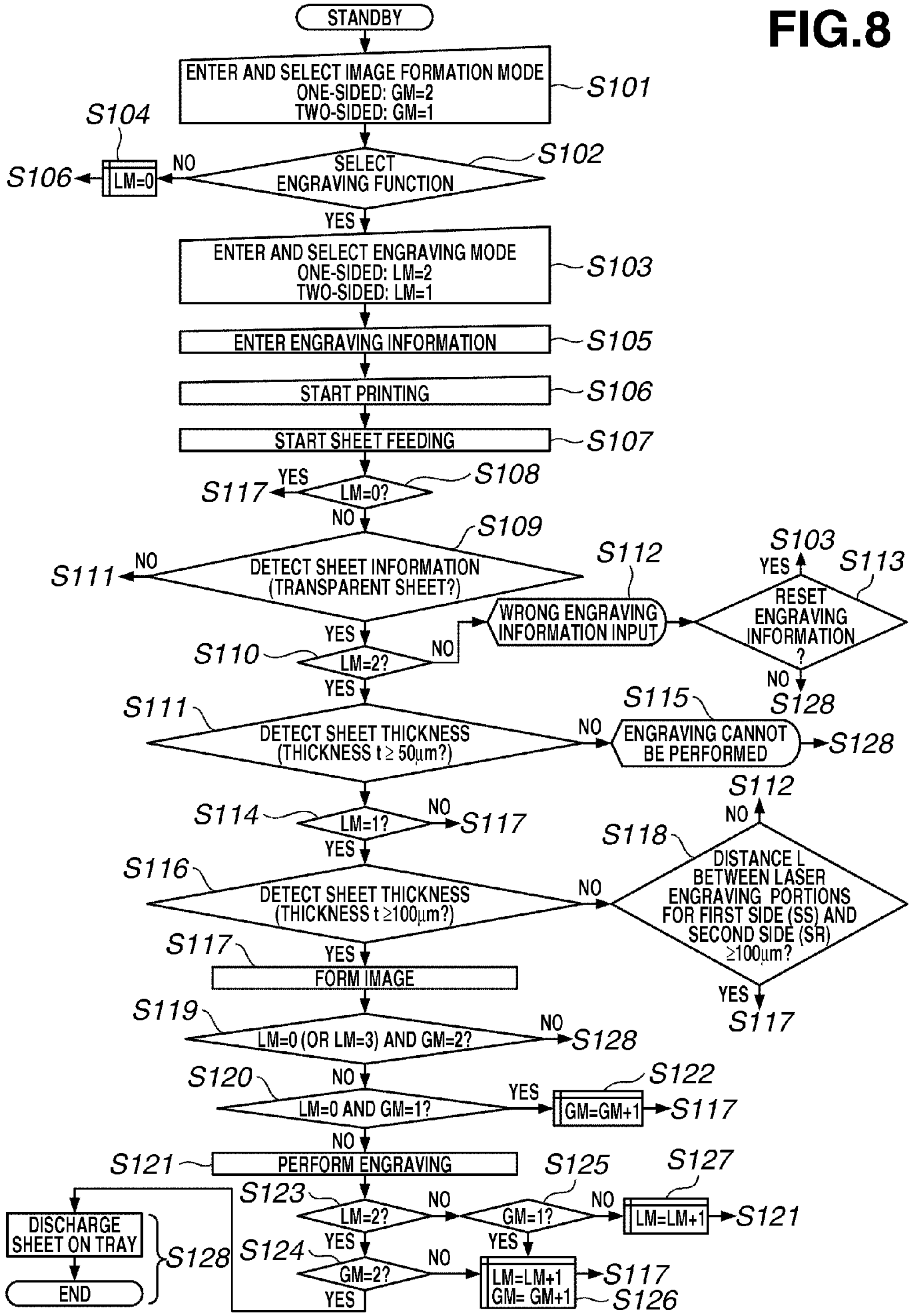
FIG. 8 is a flow chart illustrating a flow of engraving processing control performed by a laser engraving unit according to a second exemplary embodiment of the present invention.

A process flow performed in each of a one-sided engraving forming mode and a two-sided engraving forming mode will be described with reference to the flow chart of FIG. 8. When an engraving forming mode is selected, the CPU circuit unit 150 of the image forming apparatus 7 starts controlling engraving processing according to the process flow in steps S101 through S126 of FIG. 8.

In step S101, the CPU circuit unit 150 inputs an image forming mode, such as a one-side image forming mode or a two-sided image forming mode. The CPU circuit unit 150 records the input image forming mode (GM value (one-sided: GM=2, two-sided: GM=1)).

In step S102, the CPU circuit unit 150 determines whether the user has selected an engraving forming mode. If it is determined in step S102 that the user has selected the engraving forming mode, then the process advances to step S103. On the other hand, if it is determined in step S102 that the user has not selected the engraving forming mode, the process advances to step S104.

In step S103, the CPU circuit unit 150 inputs the selected engraving forming mode (the one-sided engraving forming mode or the two-sided engraving forming mode). The CPU circuit unit 150 records the input engraving forming mode (LM value (one-sided: LM=2, two-sided: LM=1)).

In step S104, since the user has selected no engraving forming mode, the CPU circuit unit 150 records the value "LM=0", and then the process advances to step S106. In step S105, the user enters engraving information, such as the engraving forming side, the shape, position, and size of engraving to be formed, and an area designated for image formation via the operation unit 153 of the image forming apparatus 7 or via the PC terminal 260 in communication with the image forming apparatus 7.

If it is determined in step S111, as described, by the sheet thickness detection unit 400 that the sheet thickness is smaller than the predetermined sheet thickness (first thickness), then the CPU circuit unit 150 restricts the values entered in step S105.

In step S106, the user initiates printing by the image forming apparatus 7 via the image forming apparatus 7 or the PC terminal 260 in communication with the image forming apparatus 7. In step S107, the CPU circuit unit 150 rotates the pickup roller 1 to start feeding of the sheet. Thus, the sheet is conveyed to the sheet thickness detection unit 400 associated with the registration roller pair 4.

In step S108, if the value "LM=0" is recorded (if no engraving forming mode has been selected), the process advances to step S117. On the other hand, if the value "LM=0" is not recorded (if the engraving forming mode has been selected), the process advances to step S109.

In step S109, the CPU circuit unit 150 determines whether the sheet is a transparent sheet (e.g., an OHP sheet) with the transparent sheet detection unit 12. If it is determined in step S109 that the sheet is a transparent sheet, the process advances to step S110. On the other hand, if it is determined in step S109 that the sheet is not transparent, the process advances to step S111.

In step S110, if the engraving forming mode is the one-sided engraving forming mode (LM=2), the process advances to step S111. On the other hand, if the engraving forming mode is the two-sided engraving forming mode (LM=1), the process advances to step S112.

In step S111, the CPU circuit unit 150 detects the sheet thickness with the sheet thickness detection unit 400. If it is determined in step S111 that the sheet thickness t≧50 μm (first thickness), the process advances to step S114. On the other hand, if it is determined in step S111 that the sheet thickness t<50 μm, the process advances to step S115.

In step S112, since the two-sided engraving forming mode has been selected in the case of using a transparent sheet, the CPU circuit unit 150 displays an instruction for prompting the user to reset the engraving information on the display unit (a monitor of the operation unit 153 or a monitor of the PC terminal 260 in communication with the image forming apparatus 7), indicating that wrong engraving information is entered. The process then advances to step S113.

In step S113, if a key for resetting the engraving information is selected by the user, the process returns to step S103. On the other hand, if the key for resetting the engraving information is not selected by the user, the process advances to step S128.

In step S114, if the selected engraving forming mode is the two-sided engraving forming mode (LM=1), the process advances to step S116. On the other hand, if the selected engraving forming mode is not the two-sided engraving forming mode (LM≠1), the process advances to step S117. In step S115, the CPU circuit unit 150 displays a message indicating "engraving cannot be formed" on a display unit (a monitor of the operation unit 153 or a monitor of the PC terminal 260 in communication with the image forming apparatus 7). The process then advances to step S128.

In step S116, the CPU circuit unit 150 detects the sheet thickness with the sheet thickness detection unit 400. If it is determined in step S116 that the sheet thickness t≧100 μm (second thickness), the process advances to step S117. On the other hand, if it is determined in step S116 that the sheet thickness t<100 μm, the process advances to step S118.

In step S117, when image information is available, the CPU circuit unit 150 performs image formation, transfers a toner image onto the sheet, and allows the transferred toner image to be fixed with the fixing roller pair 6.

Figure 9A:
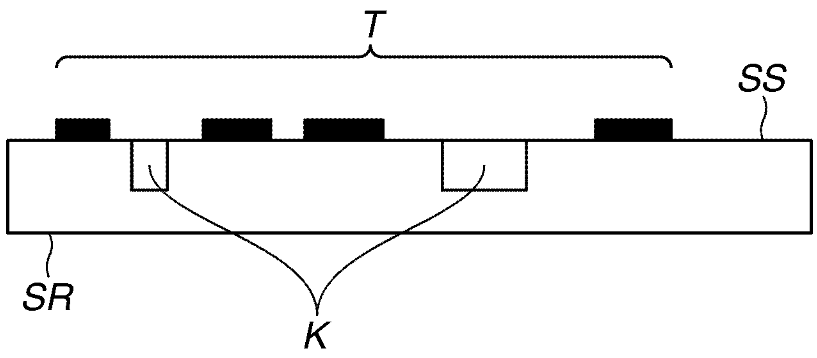
FIG. 9A and FIG. 9B each illustrate engraving processing performed by the laser engraving unit according to the second exemplary embodiment of the present invention.
Figure 9B:
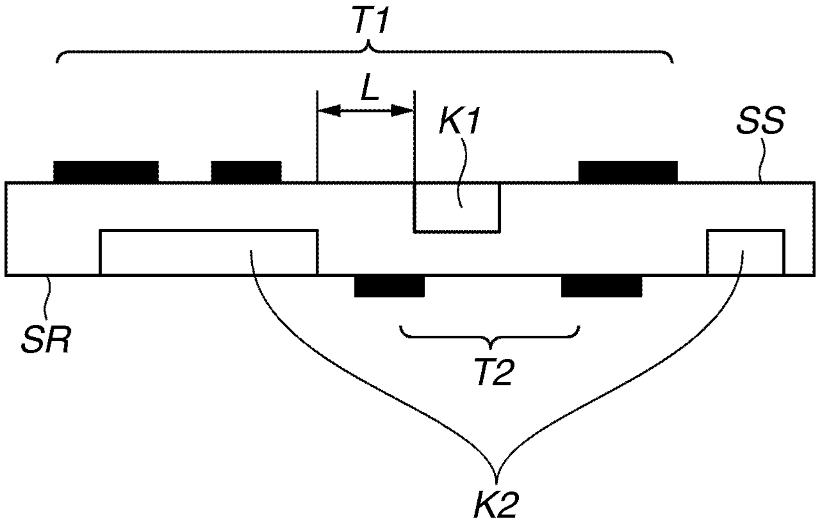

In step S118, the CPU circuit unit 150 detects a deviate distance L between respective laser engraving portions K1 and K2 of the first side SS and the second side SR (FIG. 9B). If it is determined that the deviate distance L≧100 μm, the process advances to step S117. On the other hand, if it is determined that the deviate distance L<100 μm, the process advances to step S112.

In step S119, if the recorded LM value and GM value are "LM=0" (if no engraving forming mode is selected) or "LM=3" (indicating that an engraving has been completely formed on one side of the sheet) and "GM=2" (indicating that an image is to be formed on one side of the sheet), the process advances to step S128. Otherwise, the process advances to step S120.

In step S120, if the recorded LM value and GM value are "LM=0" and "GM=1", the process advances to step S122. On the other hand, if the recorded LM value and GM value are not "LM=0" and "GM=1", the process advances to step S121.

In step S121, the CPU circuit unit 150 causes the laser engraving unit 18 to perform engraving on the sheet. Then, the process advances to step S123. In step S122, the CPU circuit unit 150 overwrites the GM value with the value "GM=GM+1" and internally records the overwritten value. Then, the process returns to step S117.

In step S123, if the recorded LM value is "LM=2", the process advances to step S124. On the other hand, if the recorded LM value is not "LM=2", the process advances to step S125.

In step S124, if the recorded GM value satisfies "GM=2", the process advances to step S128. On the other hand, if the recorded GM value does not satisfy "GM=2", the process advances to step S126. In step S125, if the recorded GM value satisfies "GM=1", the process advances to step S126. On the other hand, if the recorded GM value does not satisfy "GM=1", the process advances to step S127.

In step S126, the CPU circuit unit 150 overwrites the LM=3" value with the value "LM=LM+1" and the GM value with the value "GM=GM+1" and internally records the overwritten values. Then, the process returns to step S117. In step S127, the CPU circuit unit 150 overwrites the LM value with the value "LM=LM+1" and internally records the overwritten value. Then, the process returns to step S121. In step S128, the CPU circuit unit 150 discharges the sheet onto the paper discharge tray 10 and then the process ends.

FIG. 9A illustrates a cross section of a print product whose one side includes the formed engraving in the case where the sheet thickness t≧50 μm. As described above, in the present embodiment, the sheet thickness at the engraving recessed portion is set to be approximately 30 μm. Accordingly, the sheet thickness t is required to be greater than or equal to 50 μm, considering the strength of the sheet.

The one-sided engraving forming mode includes a back side engraving forming mode (first engraving forming mode), which is described above, and a front side engraving forming mode (second engraving forming mode) as illustrated in FIG. 9A.

In the back side engraving forming mode, a sheet on which an image has been formed is conveyed from the discharge roller pair 8 to the reversing conveyance unit 9 in a switchback manner. On the other hand, in the front side engraving forming mode, a sheet on which an image has been formed is conveyed directly to the reversing conveyance unit 9, at which the laser engraving unit 18 forms an engraving on the sheet.

FIG. 9B is a cross section of a print product on which an engraving is formed on both sides thereof in a state where the two-sided engraving forming mode (third engraving forming mode) is selected. Each of the laser engraving portions K is formed such that, if the sheet thickness is 50≦t<100 μm, the deviate distance L between the respective engraving positions K1 and K2 of the first side SS and the second side SR is greater than or equal to 100 μm.

If the engraving positions for the image-formed side SS and the back side SR overlap each other, it becomes difficult to secure a sufficient processing depth of the engraving recessed portion required for visually determining authenticity of the print product while securing the sheet thickness of approximately 30 μm at the engraving recessed portion. In this regard, by using the engraving positions deviating from each other on the respective front and back sides of the sheet, the strength of the sheet can be maintained.

In the case of forming an engraving on both sides of the sheet with the sheet thickness t≧100 μm, the CPU circuit unit 150 does not perform the deviate engraving.

In the case of using a transparent sheet, such as an OHP sheet, the engraving information passes through the sheet and can be visually recognized from the backside. Accordingly, in the case of using a transparent sheet, an engraving can be formed on only one side of the sheet. If the transparent sheet detection unit 12 detects that the sheet is a transparent sheet and if the two-sided engraving forming mode is set for the transparent sheet, then the CPU circuit unit 150 displays a message prompting the user to reset the engraving forming mode, indicating that a wrong setting has been performed by the user.

In the present embodiment, the engraving processing using the first through third engraving forming modes is described. However, the present embodiment is not limited to this. That is, at least two of the first through third engraving forming modes can be used to be selectively performed. For example, in another embodiment, the engraving processing can be performed by selecting either one of the back side engraving forming mode (first engraving forming mode) and the two-sided engraving forming mode (third engraving forming mode).

Thus, an engraving certifying that a print product is authentic is selectively added correspondingly with various types of sheets to stably perform engraving according to the sheet thickness and light transmission property of the sheet.

Figure 10A:
FIG. 10A and FIG. 10B each illustrate engraving processing performed by a laser engraving unit according to a third exemplary embodiment of the present invention.
Figure 10B:
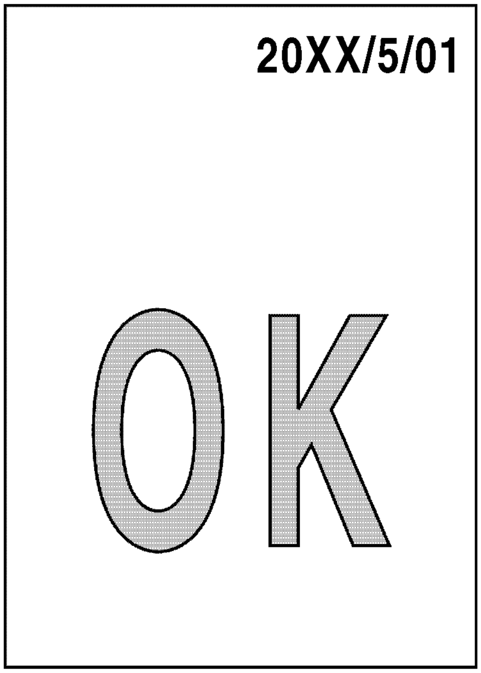

FIG. 10A and FIG. 10B each illustrate a print product according to another embodiment of the present invention, which is generated according to the two-sided engraving forming mode (third engraving forming mode).

FIG. 10A illustrates the front side of the print product. FIG. 10B illustrates the back side of the print product. Referring to FIGS. 10A and 10B, portions indicated as "PpQRSTU" and "OK" are laser-engraved portions.

As described above, engraving information, which has been subjected to reversing processing by the engraving signal control unit 251, is laser-engraved as a mirror image on a side opposite to the image-formed side of the sheet, so that the engraving information can be seen through the sheet to be visually recognizable from the image-formed side.

The laser-engraved portion on each of the front and back sides is formed at such a position that the engraving does not overlap the toner image on the opposite image-formed side. Thus, the laser-engraved portion can be seen through the sheet to be visually recognized from the image-formed side without being overlapped with the toner image.

The laser engraving information (engraving) is selectively provided with a visually recognizable recessed portion having an arbitrary shape according to the sheet thickness, the applicability of laser engraving (one-sided engraving or two-sided engraving), and the position and size of engraving based on a toner image.

Thus, the engraving information certifying that a print product is authentic can be appropriately and stably formed on the sheet. The engraving processing according to the present embodiment can also be performed in the back side engraving forming mode (first engraving forming mode) and the front side engraving forming mode (second engraving forming mode).

The above-described values related to the sheet thickness and the deviate distance are described for reference as an example only, and can be changed according to the material type of the sheet.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2006-170252 filed Jun. 20, 2006, No. 2006-170253 filed Jun. 20, 2006, and No. 2007-133040 filed May 18, 2007, which are hereby incorporated by reference herein in their entirety.

What is claimed is:

1. An engraving processing apparatus comprising:

a laser engraving unit configured to perform an engraving processing operation for forming a recessed portion on a sheet by irradiating a laser beam onto the sheet; and a controller configured to control the laser engraving unit to perform the engraving processing and to control the recessed portion to be formed on a side of the sheet opposite to a side onto which an image has been formed based on a thickness of the sheet, wherein the recessed portion does not overlap with the image.

2. The engraving processing apparatus according to claim 1, wherein if the thickness of the sheet is less than a predetermined sheet thickness, the controller does not activate the laser engraving unit.

3. The engraving processing apparatus according to claim 1, further comprising a controller configured to control the engraving processing operation, wherein the controller includes an image processing unit configured to convert engraving information for the engraving processing operation into a reverse image, and wherein the laser engraving unit is configured to engrave converted engraving information onto the side of the sheet opposite the side on which an image has been formed.

4. The engraving processing apparatus according to claim 1, further comprising a controller configured to control the engraving processing operation, wherein the controller includes a determining unit configured to determine which side of the sheet the image is to be formed on, and wherein the controller determines which side of the sheet the engraving processing operation is to be performed on based on which side the image is to be formed on.

5. An image forming apparatus comprising:

an image forming unit configured to form an image on a sheet;

a laser engraving unit configured to perform an engraving processing operation for forming a recessed portion on the sheet by irradiating a laser beam onto the sheet; and a controller configured to control the laser engraving unit to perform the engraving processing operation and to control the recessed portion to be formed on a side of the sheet opposite to a side on which the image has been formed based on a thickness of the sheet, wherein the recessed portion does not overlap the image.

6. The image forming apparatus according to claim 5, wherein if the thickness of the sheet is less than a predetermined sheet thickness, the controller does not activate the laser engraving unit.

7. The image forming apparatus according to claim 5, further comprising a controller configured to control the engraving processing operation, wherein the controller includes an image processing unit configured to convert engraving information for the engraving processing operation into a reverse image, and wherein the laser engraving unit is configured to engrave converted engraving information onto the side of the sheet opposite the side on which an image has been formed.

8. The image forming apparatus according to claim 5, further comprising a controller configured to control the engraving processing operation, wherein the controller includes a determining unit configured to determine which side of the sheet the image is to be formed on, and wherein the controller determines which side of the sheet to perform the engraving processing operation on based on which side of the sheet the image is to be formed on.

9. An image forming system comprising:

the image forming apparatus according to claim 5; and an input unit configured to input engraving information for the engraving processing operation, wherein the input unit includes a preview display unit configured to display an image to be formed by the image forming unit, and wherein the input unit is configured to input a character to be engraved, an image to be engraved, a position of engraving, and a size of engraving according to the image displayed on the preview display unit.

10. An image forming system comprising:

the image forming apparatus according to claim 5; and an input unit configured to input engraving information for the engraving processing operation, wherein the input unit includes a preview display unit configured to display an image to be formed by the image forming unit, and an image processing unit configured to convert engraving information input via the preview display unit into a reverse image, and wherein the laser engraving unit is configured to engrave converted engraving information on the side of the sheet opposite the side on which an image has been formed.

* * * * *